(12) United States Patent
Welch

(10) Patent No.: US 7,303,129 B2
(45) Date of Patent: Dec. 4, 2007

(54) METHOD AND DEVICE TO SCAN AN OBJECT AND PERFORM SELECTED FUNCTIONS RELATED THERETO

(75) Inventor: Michael S. Welch, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 465 days.

(21) Appl. No.: 10/905,375

(22) Filed: Dec. 30, 2004

(65) Prior Publication Data
US 2006/0144931 A1    Jul. 6, 2006

(51) Int. Cl.
*G06K 7/10* (2006.01)
(52) U.S. Cl. .................... 235/462.07; 235/462.46; 235/472.02
(58) Field of Classification Search ........... 235/462.07, 235/462.46, 472.02
See application file for complete search history.

(56) References Cited

U.S. PATENT DOCUMENTS

| | | |
|---|---|---|
| 2002/0082931 A1 | 6/2002 | Siegel et al. |
| 2002/0161658 A1 | 10/2002 | Sussman |
| 2003/0040969 A1* | 2/2003 | O'Hagan et al. ............. 705/21 |
| 2003/0149663 A1* | 8/2003 | Vonholm et al. ............. 705/39 |
| 2003/0173405 A1 | 9/2003 | Wilz et al. |
| 2004/0111320 A1 | 6/2004 | Schlieffers et al. |

FOREIGN PATENT DOCUMENTS

| | | |
|---|---|---|
| EP | 0 856 812 | 8/1998 |
| WO | WO 00/28455 | 5/2000 |
| WO | WO 01/22327 | 3/2001 |

OTHER PUBLICATIONS

PCT Notification of Transmittal of The International Search Report and The Written Opinion of the International Searching Authority, or The Declaration (PCT/US2005/020658, mailed Aug. 24, 2005).
PCT International Search Report for PCT/US2005/020658, mailed Aug. 24, 2005.
PCT Written Opinion of the International Searching Authority for PCT/US2005/020658, mailed Aug. 24, 2005.
Corrected Version of PCT Written Opinion of the International Searching Authority for PCT/US2005/020658, mailed Oct. 7, 2005.

* cited by examiner

*Primary Examiner*—Michael G. Lee
*Assistant Examiner*—Kristy A. Haupt
(74) *Attorney, Agent, or Firm*—Frederick D. Bailey; Moore & Van Allen, PLLC

(57) ABSTRACT

A device for communications may include a scanner to scan an object or code. The device for communications may include a processor to perform a selected function related to the scanned object or code.

33 Claims, 4 Drawing Sheets

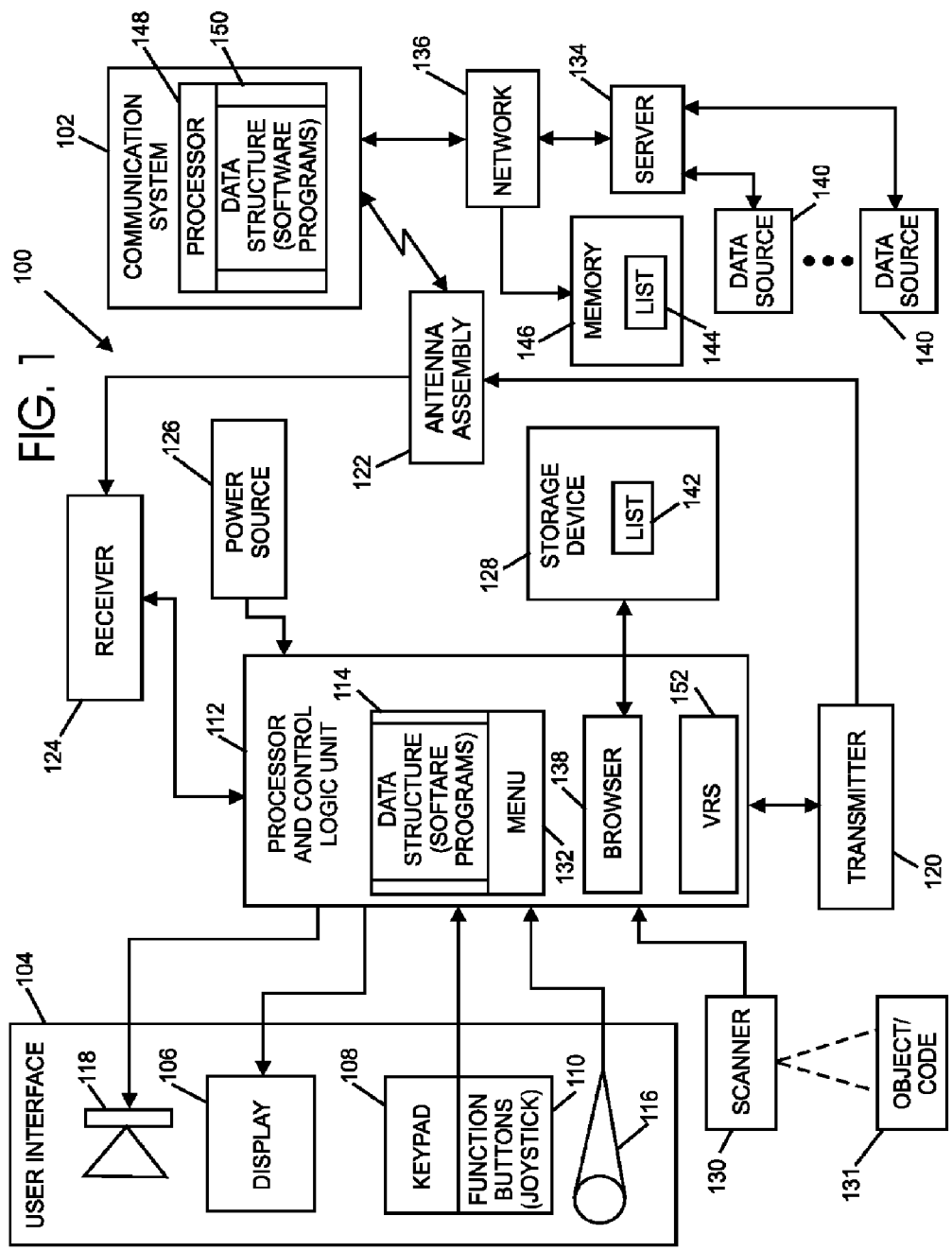

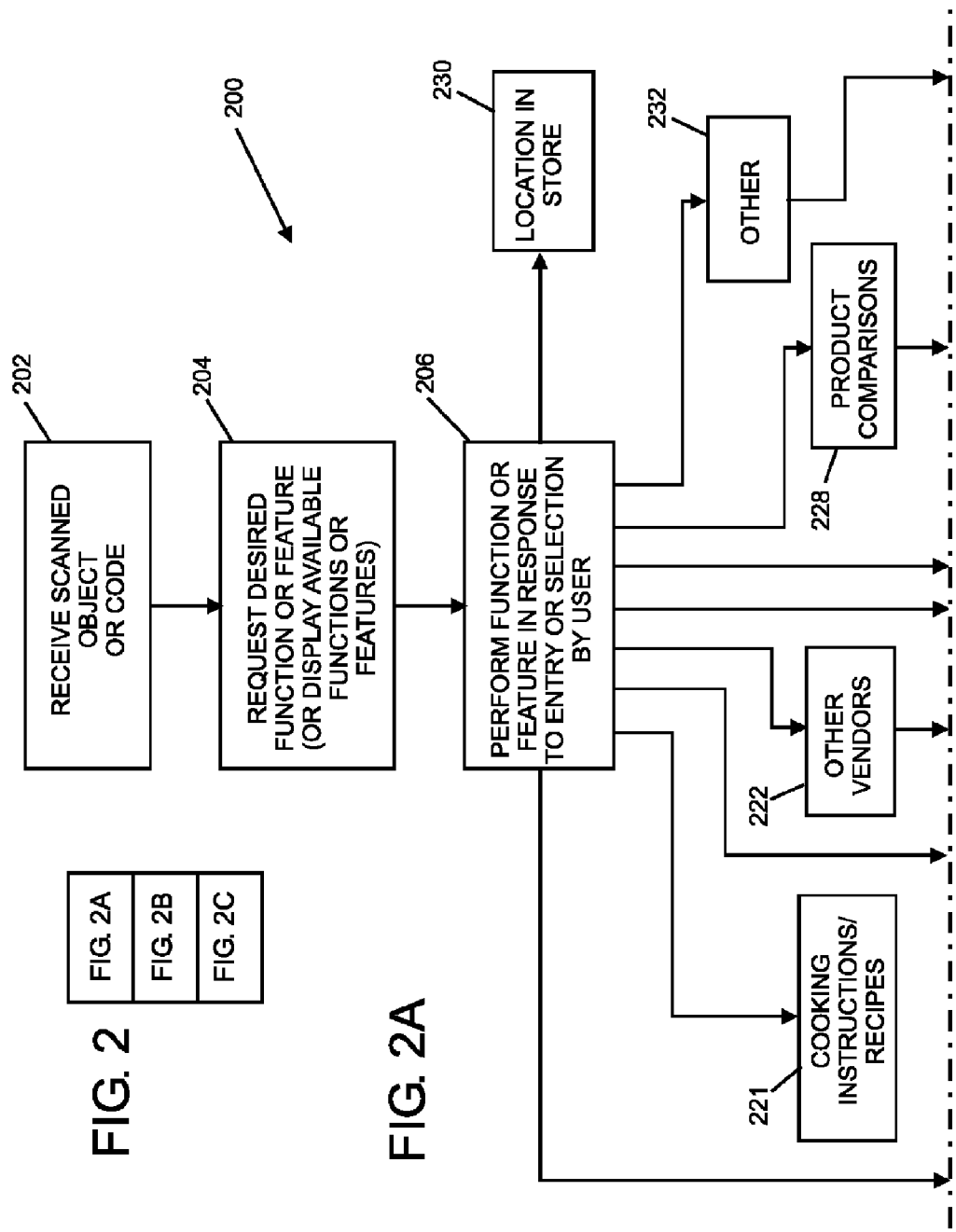

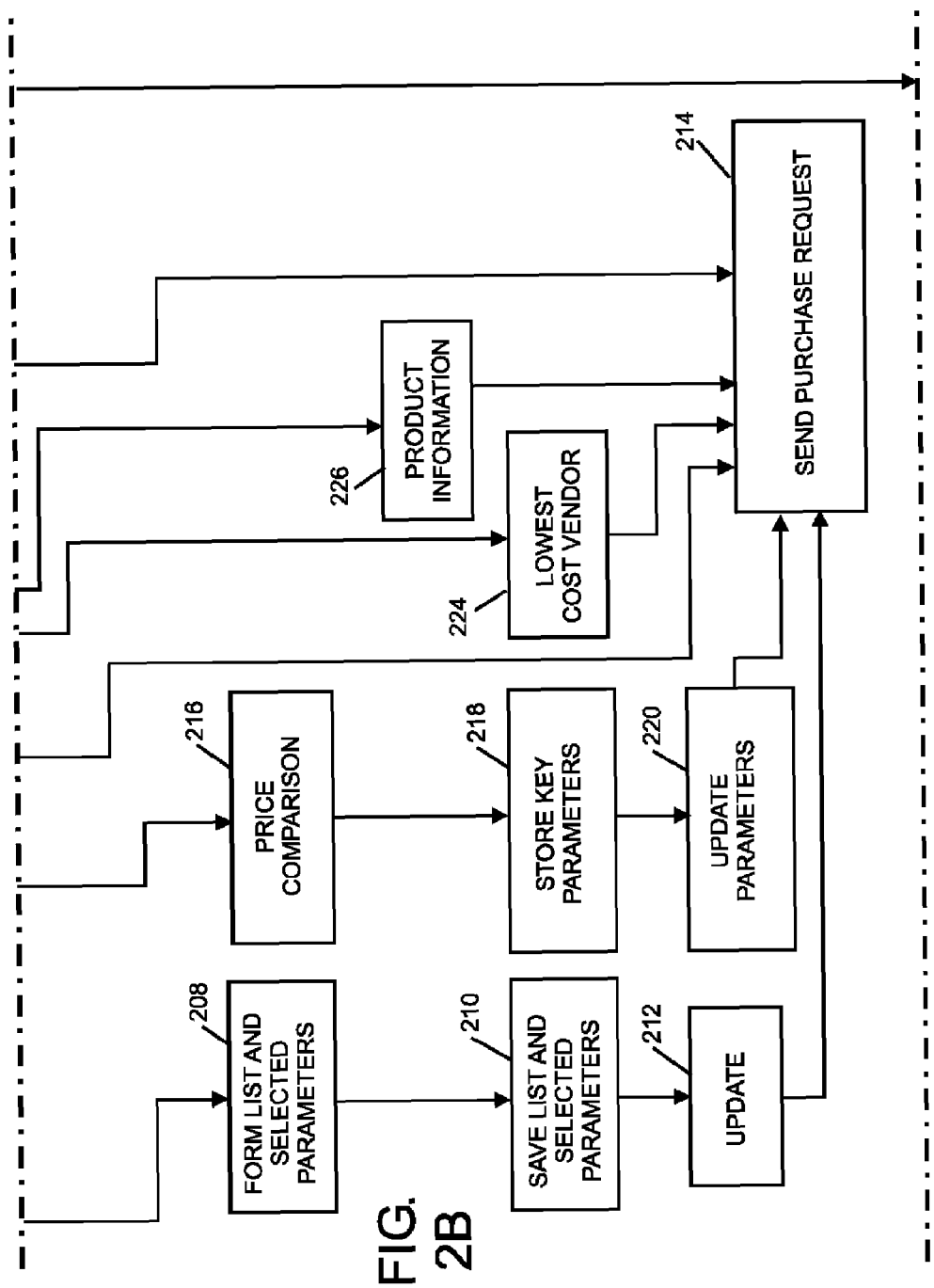

METHOD AND DEVICE TO SCAN AN OBJECT AND PERFORM SELECTED FUNCTIONS RELATED THERETO

FIELD OF THE INVENTION

The present invention relates to communications methods and devices, and more particularly to a method and device to scan an object, read a bar code, or the like and to perform a selected function or functions related thereto.

BACKGROUND

While shopping, consumers often have a need for on-demand immediate information related to a product about which they are trying to make a buying decision or desire to save product information for future use or analysis with regard to a buying decision. For example, a consumer may want to know what other vendors may sell the product or where the product may be purchased for the lowest cost. Consumers may want to compare costs and features of similar products that may perform the same or similar functions. Consumers may want to know if there have been any recalls or warnings related to the product. A consumer may not have an immediate need for the product but may be able to wait for a price reduction but may want to know when inventories reach a predetermined level so that the consumer does not have a risk of not being able to obtain the product when desired. Accordingly, the consumer may want an alert when the price of the product is reduced by a vendor or if available supplies of the product are becoming short.

In a supermarket or grocery store, a consumer may want to purchase a food product or make a particular dish or recipe. Under these circumstances, a consumer may want to know while at the supermarket what other ingredients are needed for the recipe or dish so that these can be obtained at the same time to avoid multiple trips to the store. A consumer may also what to know the cooking requirement or nutritional information related to a particular recipe or food product while at the store in order to make an informed buying decision.

There are currently no mobile or portable means for providing such information substantially instantaneously, on-demand while the consumer is at the point of purchase or elsewhere doing research to make an informed buying decision.

Once the buying decision is made, the consumer may also want to make a buying request so that the product is available when the consumer arrives at the store or the product is delivered to an address designated by the consumer.

SUMMARY

In accordance with an embodiment of the present invention, a device for communications may include a scanner to scan an object or code. The device may also include a processor to perform a selected function related to the scanned object or code.

In accordance with another embodiment of the present invention, a device for communications may include a scanner to read a universal product code (UPC) or bar code. The device may also include a menu. The menu may include a plurality of selectable functions related to the UPC. The device may also include a transmitter to transmit signals corresponding to the UPC and any selected functions to a system. A receiver may be provided to receive signals in response to the transmitted UPC and any selected functions.

In accordance with another embodiment of the present invention, a system for communications may include a wireless communications network to receive signals corresponding to an object or code and a selected function related to the object or code from a wireless communications device. A server may be connectable to the wireless communications network to perform operations in response to the signals corresponding to the object or code and the selected function.

In accordance with another embodiment of the present invention, a method for communications may include receiving a scanned object or code. The method may further include presenting a menu including a plurality of selectable functions or features related to the scanned object or code. Signals may be transmitted corresponding to the scanned object or code and any selected functions or features to a system. Other signals may be received in response to transmitting the signals corresponding to the scanned object or code and any selected functions or features.

In accordance with another embodiment of the present invention, a method for communications may include receiving a scanned object or code. The method may also include performing a selected a function or feature related to the scanned object or code. Performing the selected function or feature may include at least one of providing cooking instructions related to a product corresponding to the object or code; providing recipes related to the product corresponding to the object or code; adding the product corresponding to the object or code to a list; comparing a price of the product corresponding to the object or code to products associated with other objects or codes; comparing a price of the product associated with the object or code to the same product sold by other vendors; providing a location of the product associated with the object or code; identifying a lowest cost vendor of the product corresponding to the object or code; providing alerts related to the product associated with the object or code; providing product information related to the object or code; and providing product comparisons related to the object or code.

In accordance with another embodiment of the present invention, a method of making a communications device may include providing a scanner to read an object or code. A menu may be provided including a plurality of selectable functions related to the object or code. A transmitter may be provided to transmit signals corresponding to the scanned object or code and any selected functions to a system. A receiver may be provided to receive other signals in response to performing any selected functions related to the object or code.

In accordance with another embodiment of the present invention, a computer-readable medium having computer-executable instructions for performing a method may include receiving a scanned object or code. The method may also include performing the function or feature in response to entry or selection of the function of feature by a user. Performing the selected function or feature may include at least one of providing cooking instructions related to a product corresponding to the object or code; providing recipes related to the product corresponding to the object or code; adding the product corresponding to the object or code to a list; comparing a price of the product corresponding to the object or code to products associated with other objects or codes; comparing a price of the product associated with the object or code to the same product sold by other vendors; providing a location of the product associated with the object or code; identifying a lowest cost vendor of the product corresponding to the object or code; providing alerts related to the product associated with the object or code; providing product information related to the object or code; and providing product comparisons related to the object or code.

BRIEF DESCRIPTION OF THE DRAWINGS

FIG. 1 is a block diagram of a system and device for communications in accordance with an embodiment of the present invention.

FIGS. 2A-2C (collectively FIG. 2) are a flow chart of an example of a method for communications in accordance with an example embodiment of the present invention.

DESCRIPTION OF THE INVENTION

Figure 2C:
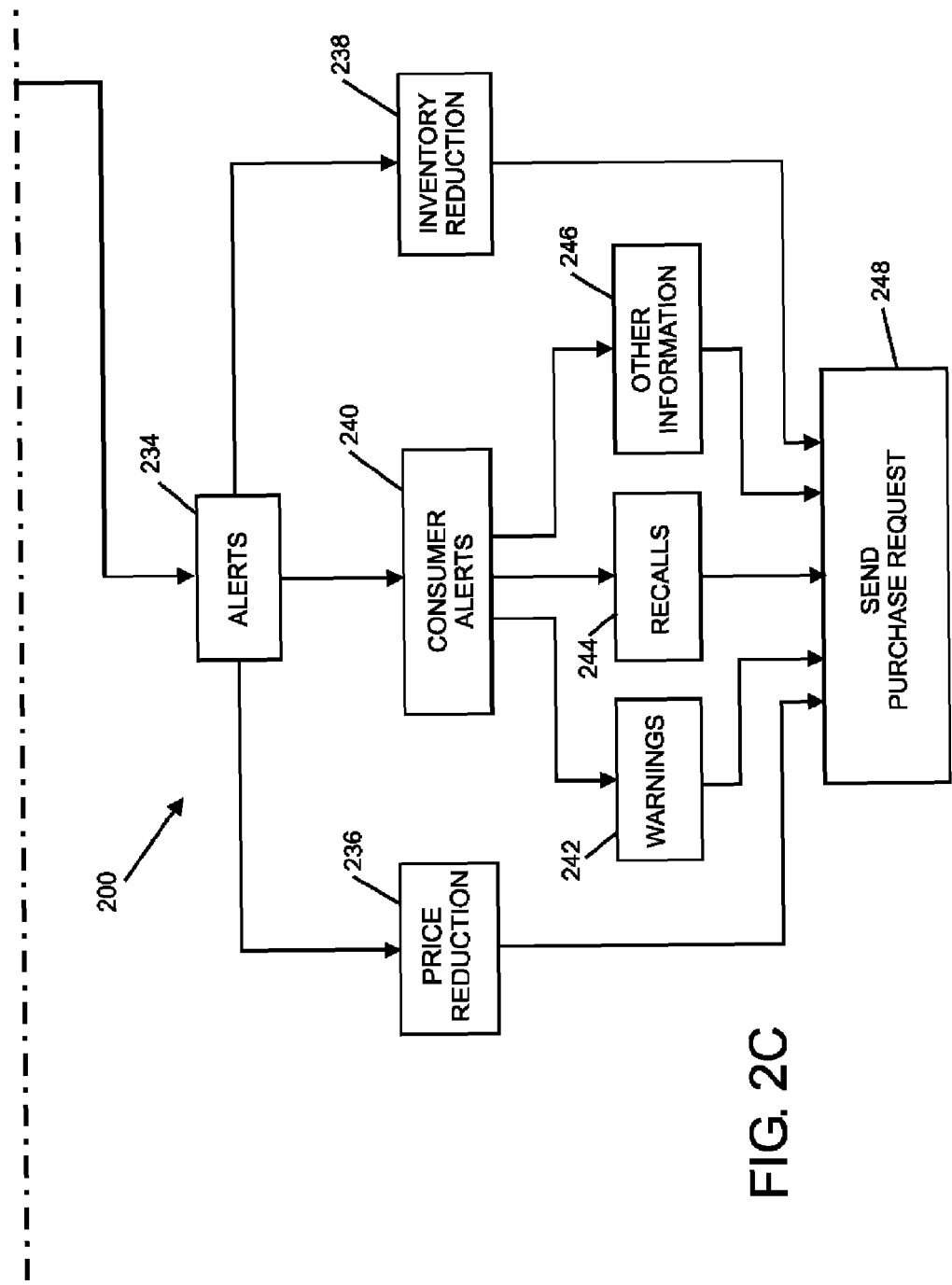

The following detailed description of preferred embodiments refers to the accompanying drawings which illustrate specific embodiments of the invention. Other embodiments having different structures and operations do not depart from the scope of the present invention.

FIG. 1 is a block diagram of a communications device 100 operable in association with a communications system 102 in accordance with an embodiment of the present invention. The communications system 102 may be a mobile, wireless or cellular communications system or similar system. The communications system 102 may include one or more terrestrial communications channels or links and one or more aerospace communications channels or links. In other embodiments, the communications system 102 may be any communications system including by way of example, dedicated communications lines, telephone networks, wireless data transmission systems, two-way cable systems, customized computer networks, interactive kiosk networks and the like.

The communications device 100 may be a cordless telephone, cellular telephone, personal digital assistant (PDA), communicator, computer device or the like and is not unique to any particular communications standard, such as Advanced Mobile Phone Service (AMPS), Digital Advanced Mobile Phone Service (D-AMPS), Global System for Mobile Communications (GSM), Code Division Multiple Access (CDMA) or the like. The present invention may also be used in any Third Generation (3G) networks, such as Universal Mobile Telecommunications Systems (UTMS) FDD (Frequency Division Duplex) and TDD (Time Division Duplex), cdma 2000 3x, TD-SCDMA, Arib WCDMA, EDGE (Enhanced Data Rates for GSM Evolution), IMT-2000 DECT (International Mobile Telecommunications for 2000, Digital European Cordless Telecommunications), Fourth Generation (4G) networks and systems and the like The layout illustrated in FIG. 1 is for purposes of explaining the present invention and the present invention is not limited to any particular design.

The communications device 100 may include an operator or user interface 104 to facilitate controlling operation of the communications device 100 including initiating and conducting phone calls and other communications. The user interface 104 may include a display 106 to provide visual signals to a subscriber or user as to the status and operation of the communications device 100. The display 106 may be a liquid crystal display (LCD) or the like capable of presenting color images. The display 106 may provide information to a user or operator in the form of images, text, numerals, characters, a graphical user interface (GUI) and the like. The user interface 104 may also include a keypad 108 and function keys or buttons 110 including a pointing device, such as a joystick or the like. The keypad 108, function buttons and joystick 110 permit the user to communicate commands to the communications device 100 to dial phone numbers, initiate and terminate calls, establish other communications, such as access to the Internet, send and receive email, text messages and the like. The keypad 108, function buttons and joystick 110 may also be used to control other operations, features or functions of the communications device 100.

The display 106, keypad 108, and function buttons 110 may be coupled to a main processor and control logic unit 112. The main processor and control logic unit 112 may be a microprocessor or the like. The main processor and logic unit 112 may include data structures 114, software programs, computer applications and the like to encode and decode control signals, perform communications procedures and other functions as described herein.

The user interface 104 may also include a microphone 116 and a speaker 118. The microphone 116 may receive audio or acoustic signals from a user or from any acoustic source. The microphone 116 may convert the audio or acoustic signals to electrical signals. The microphone 116 may be connected to the main processor and logic unit 112 wherein the main processor and logic unit 112 may convert the electrical signals to baseband communication signals. The main processor and control logic unit 112 may be connected to a transmitter 120 that may convert baseband signals from the main processor and control logic unit 112 to radio frequency (RF) signals. The transmitter 118 may be connected to an antenna assembly 122 for transmission of the RF signals to the communications system 102 or medium.

The antenna assembly 122 may receive RF signals over the air and transfer the RF signals to a receiver 124. The receiver 124 may convert the RF signals to baseband signals. The baseband signals may be applied to the main processor and control logic unit 112 which may convert the baseband signals to electrical signals. The processor and control unit 112 may send the electrical signals to the speaker 118 which may convert the electrical signals to audio signals that can be understood by the user. For data or other non-audio signals, such as short message service (SMS), email, or other data signals, the messages converted by the processor and control unit 112 may be presented on the display 106.

A power source 126 may be connected to the main processor and control logic unit 112 to provide power for operation of the communications device 100. The power source 126 may be a rechargeable battery or the like. The communications device 100 may also include at least one data storage device 128. The data storage device 128 may store lists of phone numbers. Examples of the lists may include phone numbers entered and stored by action of the user, such as in a phonebook portion of the storage device 128, phone numbers for calls that have been missed or not answered, phone numbers that have been called by the communications device 100 and the like. The data storage device 128 may be a computer-readable medium to store computer-executable or computer-usable instructions or data structures, such as data structures 114, to perform special operations or functions such as those described in accordance with embodiments of the present invention.

A scanner 130 to capture an object or read a code 131, may connect to the communications device 100 or may be an integrated component of the communications device 100. The scanner 130 may be an infrared scanner or bar code scanner for reading a universal product code (UPC) or the like. The object or code 131 may therefore be a bar code or UPC.

A menu 132 that may include a plurality of selectable functions or features may be stored in the communications device 100. The selectable functions or features may be performed completely or partially by the communications device 100 and the communications system 102 or other components as described in more detail herein. The menu 132 may be stored as part of the data structure 114 in the processor and control logic unit 112 or may be stored in the storage device 128. The selectable functions or features may be related to the UPC and the specific menu functions or features available for selection may be depend upon the UPC received by the communications device 100. The menu may be displayed or presented on the display 106 for selection of one or more functions or features by a user. The user may scroll through the functions or features displayed using the function buttons or joystick 110 or other control available on the communications device 100. A desired function or feature may be highlighted or otherwise identified when scrolled to and may be selected by operating an appropriately labeled function button 110 for selecting from menu 132. Alternatively, a user may enter a function or feature using a keypad 108 and function buttons 110 or may enter a portion of a desired function or feature and the communications device may use an intelligent search feature or the like to facilitate efficient location of the desired function or feature for selection by the user. Once selected, signals corresponding to the scanned UPC and selected function or feature may be transmitted by the transmitter 120 to the system 102 for performance of the function or feature. Depending upon the function or feature, all or portions of the function or feature may be performed by the system 102 or all or portions may be performed by the communications device 100. One or more servers 134 may be accessed via the communications system 102 in performing the selected function or feature. The server 134 may be accessed via a network 136 or medium that may be a private network, the Internet or the like. The communications device 100 may include a browser 138 to access the network 136 and server 134 or servers on the network 136. The communications device 100 may also access data sources 140 via the server 134 to obtain or download information that may be needed to perform the functions or features selected from the menu 132. The browser 152 may operate on the processor and control logic unit 112. The browser 152 may be similar to Netscape®, Microsoft® Internet Explorer or the like.

Examples of the functions or features that may be selected from the menu 132 may include providing cooking instructions or recipes related to a grocery item or product corresponding to the UPC or other code; comparing a price of the product or item associated with the UPC to the same product sold by other vendors; identifying a lowest cost vendor for the product or item associated with the UPC; and providing a location of the product or item associated with the UPC, either within a particular store or geographical area. Other examples of the functions or features that may be selected from the menu 132 may include comparing a price of the product or item corresponding to the UPC to other products with different associated UPC that may be used for the same purpose or are substitutes; accessing detailed information related to the product associated with the UPC, such as specifications, product features, consumer reviews, ratings, rankings or similar information that may help make an informed buying decision. The menu 132 may also include an option to access comparison information of the product of interest to competing products that may include information, such as feature comparisons, price comparisons, consumer reviews, ratings, rankings, reliability and maintenance issues and the like. The menu 132 may also include an option to access any alerts related to the product associated with the UPC, such as recalls, warnings or other consumer alerts or information related to the product.

Under some circumstances, the consumer may desire the product or item but does not need it immediately and can wait for a sale or price reduction but does not want the product to be sold out. Accordingly, other alert options in the menu 132 may be to provide an alert regarding a price reduction or sale of the product or item, when inventory levels are becoming low or similar consumer alerts.

A further option in the menu 132 may permit the consumer to add the product or item associated with the UPC to a list 142 or 144 for later shopping, forwarding, price and feature comparison or other purpose. The menu 132 may include an option to provide updates for the items or products stored in the list 142 or 144, such as price changes, inventory levels, available vendors, recalls or other information. The list 142 may be stored in the storage device 128 that is part of the communications device 100 or the list 144 may be stored in a memory location 146 that may be associated with the communications system 102 or accessible via the network 136 or server 134.

The communications system 102 may include a processor 148 or the like that may include a data structure 150 or computer-executable instruction to perform at least some of the functions or features described above. The data structure 150 may also operate in coordination with the data structure 114 in the communications device 100 to perform the functions or features previously described. The data structure 150 may perform all aspects of some of the functions or features described above and portions of other functions or features to conserve computational overhead and memory utilization in the communications device 100. Some data or information stored on the system 102 or accessible via the system 102 may be returned to the communications device 100 to carry out any predetermined functions or operations or vice versa.

In an alternate embodiment of the present invention the server 134 may also include computer executable instructions to perform at least some or all of the features and functions described above. The server 134 may also store the menu 132 or provide access to the menu 132 contained on a data source 140 accessible by the server 134. The communications device 100 may then access the server 134 and menu 132 using the browser 138 to select the desired functions or features to be performed. In this manner, the communications device 100 assumes minimal computationally and storage overhead in performing the functions or features and this burden is predominantly assumed by the system or server 134. Accordingly, the consumer related functions and features may be a service provided by a wireless carrier or the like that can be marketed as an additional available feature or service that can be subscribed to.

The communications device 100 may also include a voice recognition system (VRS) 152 or function. The voice recognition system 152 may be embodied in hardware, software, firmware, a combination thereof or the like and may operate in association with the processor and control logic unit 112. The voice recognition system 152 may be coupled to the microphone 116 to permit a user or operator to control operation of the communications device 100 by voice commands to establish communications or perform other operations or functions, such as selecting the features or functions in menu 132.

FIGS. 2A and 2B (collectively FIG. 2) are a flow chart of an example of a method 200 for communications in accordance with an embodiment of the present invention. The method 200 may be embodied in a communications device, such as device 100 of FIG. 1 in the form of a data structure, such as the data structures 114, to perform predetermined functions or features similar to those described with respect to FIG. 1. Some of the functions or features of the method 200 may also be embodied partially or completely in a data structure of a communications system or server, such as communications system 102 or server 134, which may be operational in association with a communications device or devices, similar to communications device 100.

In block 202, a scanned object or code may be received. As discussed with respect to FIG. 1, the object or code may be a universal product code (UPC) or the like that may be read by an infrared scanner, bar code reader or the like. In block 204, a desired function or feature related to the object, code or UPC may be requested or entered by a user. Alternatively, a menu, similar to menu 132 of FIG. 1, may be presented or displayed on a display of the communications device, such as the display 106 of FIG. 1. The menu may contain brief descriptions or otherwise identify available functions or features that may be performed by the communications device, communications system or server or combination of all three. In block 206, the function or feature associated with the scanned object, code or UPC may be performed in response to entering or selecting from the menu one or more functions or features by a user.

In block 208, the product or item associated with the object, code or UPC may be added to a list to form a list that may include selected parameters associated with the product or item. Examples of the selected parameters may include price, desired features, availability and from which vendors, or other product information. In block 210 the list may be saved along with the selected parameters. The list may be similar to lists 142 and 144 in FIG. 1. In block 212, the list and selected parameters may be updated periodically. The user may select a time period to check for and download any available updates or updates may be automatically downloaded to the list whenever available. The user may select the desired update option from the available options that may be presented in the menu or in another screen or graphical user interface (GUI) in response to the user selecting the update option. In block 214, the user may send a purchase request for one or more of the items or products in the list. The user may be presented other screens or GUIs on a display to select further options with respect to purchasing the item or product. For example, one option may be hold the item or product at the store for pickup and payment by the user. Alternatively, credit card, debit card, electronic funds transfer or other payment method may automatically be sent, if selected by the user, in response to sending the purchase request. The item or product may then be delivered to the user or made available for pickup at the vendor's location.

In block 216, the information in the list formed in block 208 may be used to generate a price comparison that may be presented to the user or requestor. In block 218 key parameters may be stored or saved for future reference; such as while the user is shopping. Examples of key parameters may include price, desired features, availability and from which vendors, or other product information. In block 220, any parameters may be updated, either automatically when available or at predetermined time periods, similar to that previously discussed. At anytime, the user may go into the menu or select a product or item from the list and send a purchase request in block 214 similar to that previously described.

In block 221, another feature or function that may be selected by a user and displayed to the user in response to scanning an object, code or UPC received in block 202 may cooking or preparation instructions for a particular food product in a grocery store or supermarket or recipes associated with a food product or item. The user may also enter a particular type of dish or food item and select an option to provide all of the ingredients needed to make the selected food item.

In block 222, another feature or function may be to present or display other vendors of the product or item associated with the scanned object, code or UPC received in block 202. A vendor may be selected from the list and a purchase request for the item or product sent to the selected vendor in block 214 as previously described. In block 224, a lowest cost vendor may be determined and presented and a purchase request sent in block 214, if selected by the user. In block 228, specific product information related to the scanned UPC in block 202 may be presented and in block 228 product comparisons may be presented if this option is selected or entered in block 204. In block 230, a location of the product corresponding to the UPC may be provided and displayed to the user.

In block 232, other functions or features selected by a user may be performed. An example of other functions or features may be alerts in block 234 (FIG. 2B). An alert associated with a price reduction may be sent in block 236 and an inventory reduction alert may be sent in block 238. Other examples may include consumer alerts 240, such as warnings 242, recalls 244 and other information 246, similar to those previously described. In block 248, a purchase request may be selected and sent similar to that described with respect to block 214 in FIG. 2A.

Elements of the present invention may be embodied in hardware and/or software as a computer program code that may include firmware, resident software, microcode or the like. Additionally, elements of the invention, such as data structures 114 and 150 and method 200, may take the form of a computer program product on a computer-usable or computer-readable storage medium having computer-usable or computer-readable program code embodied in the medium for use by or in connection with a device or system, such as device 100 or system 102 of FIG. 1. Examples of such a medium may be illustrated in FIG. 1 as network 136, data sources 140 or similar devices. A computer-usable or readable medium may be any medium that may contain, store, communicate or transport the program for use by or in connection with a device or system. The medium, for example, may be an electronic, magnetic, optical, electromagnetic, infrared or semiconductor system or the like. The medium may also be simply a stream of information being retrieved when the computer program product is "downloaded" through a network such as the Internet. The computer-usable or readable medium could also be paper or another suitable medium upon which the program may be printed.

While the present invention has been described with respect to wireless communications devices and the like, the features described with respect to the present invention are also applicable to communications devices that may be connected to a wired system or network. Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A device for communications, comprising:
   a scanner to scan an object or code;
   a menu including a plurality of selectable functions related to the object or code; and
   a processor to perform a selected function of the plurality of functions related to the scanned object or code, one of the selectable functions comprising providing product comparison information related to the object or code comprising a price comparison of a product associated with the object or code to a same product sold by other vendors, and another one of the selectable functions comprising identifying a lowest cost vendor of the product corresponding to the object or code.

2. The device of claim 1, wherein the scanner is an infrared scanner.

3. The device of claim 1, wherein the device for communications comprises a wireless communications device including a bar code reader.

4. The device of claim 1, wherein the object or code comprises a universal product code (UPC).

5. The device of claim 4, wherein the plurality of selectable functions comprises at least one of:
   providing cooking instructions related to a product corresponding to the UPC;
   providing recipes related to the product corresponding to the UPC;
   adding the UPC to a list of UPCs;
   comparing a price of the product corresponding to the UPC to products associated with other UPCs;
   comparing a price of the product associated with the UPC to the same product sold by other vendors;
   providing a location of the product associated with the UPC;
   identifying a lowest cost vendor of the product corresponding to the UPC;
   providing alerts related to the product associated with the UPC;
   providing product information related to the UPC; and
   providing product comparison information related to the UPC.

6. The device of claim 5, wherein the alerts comprise consumer alerts including price reductions, inventory reductions, recalls and warnings.

7. The device of claim 6, further comprising a receiver to receive signals in response to selecting one of the plurality of functions.

8. The device of claim 7, wherein the signals comprise one of short message service messages, email messages or voice or data messages.

9. The device of claim 1, wherein the communications device comprises a cellular telephone.

10. A device for communications, comprising:
    a scanner to read a UPC;
    a menu including a plurality of selectable functions related to the UPC;
    a transmitter to transmit signals corresponding to the UPC and any selected functions to a system; and
    a receiver to receive other signals in response to performing any selected functions related to the UPC,
    wherein one of the selectable functions comprises providing product comparison information related to the UPC comprising a price comparison of a product associated with the UPC to a same product sold by other vendors, and another one of the selectable functions comprising identifying a lowest cost vendor of the product corresponding to the UPC.

11. The device of claim 10, wherein the plurality of selectable functions comprises at least one of:
    providing cooking instructions related to a product corresponding to the UPC;
    providing recipes related to the product corresponding to the UPC;
    adding the UPC to a list of UPCs;
    comparing a price of the product corresponding to the UPC to products associated with other UPCs;
    providing a location of the product associated with the UPC;
    providing alerts related to the product associated with the UPC; and
    providing product information related to the UPC.

12. The device of claim 11, wherein the alerts comprise consumer alerts including price reductions, inventory reductions, recalls and warnings.

13. The device of claim 10, further comprising a browser to access information related to the UPC and any selected functions.

14. The device of claim 10, wherein the communications device comprises a wireless communications device.

15. The device of claim 10, wherein the receiver is adapted to receive short message service (SMS), email, voice or data signals including information related to the UPC and any selected functions.

16. A system for communications, comprising:
    a wireless communications network to receive signals corresponding to an object or code and a selected function of a plurality of selectable functions related to the object or code from a wireless communications device; and
    a server connectable to the wireless communications network to perform operations in response to the signals corresponding to the object or code and the selected function,
    wherein one of the selectable functions comprises providing product comparison information related to the object or code comprising a price comparison of a product associated with the object or code to a same product sold by other vendors, and another one of the selectable functions comprising identifying a lowest cost vendor of the product corresponding to the object or code.

17. The system of claim 16, wherein the selected function comprises at least one of:
    providing cooking instructions related to a product corresponding to the object or code;
    providing recipes related to the product corresponding to the object or code;
    adding the product corresponding to the object or code to a list;
    comparing a price of the product corresponding to the object or code to products associated with other objects or codes;
    providing a location of the product associated with the object or code;

providing alerts related to the product associated with the product corresponding to the object or code; and providing product information related to the object or code.

18. The system of claim 17, wherein the alerts comprise consumer alerts including price reductions, inventory reductions, recalls and warnings.

19. The system of claim 16, further comprising a plurality of data sources accessible by the server to provide information in response to the object or code and the selected function.

20. A method for communications, comprising:

receiving a scanned object or code;

presenting a menu including a plurality of selectable functions or features related to the scanned object or code;

transmitting signals corresponding to the scanned object or code and any selected functions or features to a system; and receiving other signals in response to performing any selected functions or features related to the scanned object or code, wherein one of the selectable functions comprises providing product comparison information related to the object or code comprising a price comparison of a product associated with the object or code to a same product sold by other vendors, and another one of the selectable functions comprising identifying a lowest cost vendor of the product corresponding to the object or code.

21. The method of claim 20, wherein the object or code comprises a universal product code (UPC).

22. The method of claim 20, wherein the plurality of functions comprises at least one of:

providing cooking instructions related to a product corresponding to the UPC; providing recipes related to the product corresponding to the UPC;

adding the UPC to a list of UPCs;

comparing a price of the product corresponding to the UPC to products associated with other UPCs;

comparing a price of the product associated with the UPC to the same product sold by other vendors;

providing a location of the product associated with the UPC;

identifying a lowest cost vendor of the product corresponding to the UPC;

providing alerts related to the product associated with the UPC;

providing product information related to the UPC; and providing product comparisons related to the UPC.

23. A method for communications, comprising:

receiving a scanned object or code; and performing a selected a function or feature from a menu of a plurality of selectable functions or features related to the scanned object or code, one of the selectable functions or features comprising providing product comparison information related to the object or code comprising a price comparison of a product associated with the object or code to a same product sold by other vendors, and another one of the selectable functions or features comprising identifying a lowest cost vendor of the Product corresponding to the object or code.

24. The method of claim 23, wherein receiving the scanned object or code comprises receiving a universal product code (UPC).

25. The method of claim 23, further comprising transmitting signals corresponding to the scanned object or code and any entered or selected function or feature to a system.

26. The method of claim 23, further comprising sending a purchase request.

27. The method of claim 23, wherein performing the selected function or feature includes at least one of:

providing cooking instructions related to a product corresponding to the object or code;

providing recipes related to the product corresponding to the object or code;

adding the product corresponding to the object or code to a list;

comparing a price of the product corresponding to the object or code to products associated with other objects or codes;

providing a location of the product associated with the object or code;

providing alerts related to the product associated with the object or code; and providing product information related to the object or code.

28. A method of making a communications device, comprising:

providing a scanner to read an object or code;

providing a menu including a plurality of selectable functions related to the object or code;

providing a transmitter to transmit signals corresponding to the scanned object or code and any selected functions to a system; and providing a receiver to receive other signals in response to performing any selected functions related to the object or code, wherein one of the selectable functions comprises providing product comparison information related to the object or code comprising a price comparison of a product associated with the object or code to a same product sold by other vendors, and another one of the selectable functions comprising identifying a lowest cost vendor of the product corresponding to the object or code.

29. The method of claim 28, wherein the plurality of selectable functions comprises at least one of:

providing cooking instructions related to a product corresponding to the object or code;

providing recipes related to the product corresponding to the object or code adding the product corresponding to the object or code to a list;

comparing a price of the product corresponding to the object or code to products associated with other objects or codes;

providing a location of the product associated with the object or code;

providing alerts related to the product associated with the object or code; and providing product information related to the object or code.

30. A computer-readable medium having computer-executable instructions for performing a method, comprising:

receiving a scanned object or code; and performing a selected function or feature of a rlurality of selectable functions or features related to the scanned object or code in response to entry or selection of the function or feature by a user, wherein one of the selectable functions or features comrrises providing product comparison information related to the object or code comprising a price comparison of a product associated with the object or code to a same product sold by other vendors, and another one of the selectable functions or features comprising identifying a lowest cost vendor of the product corresponding to the object or code.

31. The computer-readable medium having computer-executable instructions for performing the method of claim 30, wherein the scanned object or code comprises receiving a universal product code (UPC).

32. The computer-readable medium having computer-executable instructions for performing the method of claim 30, further comprising transmitting signals corresponding to the scanned object or code and any entered or selected function or feature to a system.

33. The computer-readable medium having computer-executable instructions for performing the method of claim 30, wherein performing the function or feature includes at least one of:

providing cooking instructions related to a product corresponding to the object or code;

providing recipes related to the product corresponding to the object or code;

adding the product corresponding to the object or code to a list;

comparing a price of the product corresponding to the object or code to products associated with other objects or codes;

providing a location of the product associated with the object or code;

providing alerts related to the product associated with the object or code; and providing product information related to the object or code.

* * * * *